United States Patent
Bhatt et al.

(10) Patent No.: US 10,659,559 B2
(45) Date of Patent: May 19, 2020

(54) IDENTIFYING AND PURGING UNWANTED CONTACTS FROM A CONTACT LIST BASED ON THE CONSTRUCTION OF A PERSONA PROFILE

(71) Applicant: International Business Machines Corporation, Armonk, NY (US)

(72) Inventors: Sonal Bhatt, Pune (IN); Sonia L. Sequeira, Pune (IN); Hemant K. Sivaswamy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 15/718,254

(22) Filed: Sep. 28, 2017

(65) Prior Publication Data
US 2019/0098111 A1    Mar. 28, 2019

(51) Int. Cl.
  *G06F 1/3234*    (2019.01)
  *G06F 8/65*      (2018.01)
  *H04L 29/08*     (2006.01)
  *G06F 16/22*     (2019.01)

(52) U.S. Cl.
  CPC ........ *H04L 67/306* (2013.01); *G06F 16/2282* (2019.01); *H04L 67/12* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 7,606,351 B2 | 10/2009 | Niwa | |
| 8,041,024 B2 | 10/2011 | Chen et al. | |
| 8,577,895 B2 | 11/2013 | Gupta et al. | |
| 10,102,844 B1* | 10/2018 | Mois | G06F 16/3329 |
| 2007/0071206 A1* | 3/2007 | Gainsboro | H04M 3/2281 379/168 |
| 2009/0216569 A1* | 8/2009 | Bonev | G06Q 10/109 705/5 |
| 2012/0149360 A1* | 6/2012 | Ross | G06F 19/3418 455/420 |
| 2013/0137479 A1 | 5/2013 | Baek et al. | |
| 2013/0254216 A1* | 9/2013 | Yamamoto | G09B 7/02 707/749 |

(Continued)

*Primary Examiner* — Clayton R Williams
*Assistant Examiner* — Christopher B Robinson
(74) *Attorney, Agent, or Firm* — Cantor Colburn LLP; Reza Sarbakhsh

(57) ABSTRACT

Provided are systems, methods, and media for identifying and purging unwanted contacts. An example method includes monitoring electronic group communication that is conducted between two or more people and building a persona profile for a person of the electronic group communication during a first period of time based, at least in part, on extracting during the first period of time, from the monitored electronic group communication, behavior data associated with a first contact number. The method includes detecting, during a second period of time, whether the person associated with the first contact number has changed. The method includes transmitting an alert to at least one person of the two or more people indicating that the person associated with the first contact number has changed.

17 Claims, 6 Drawing Sheets

(56) References Cited

U.S. PATENT DOCUMENTS

| | | | |
|---|---|---|---|
| 2014/0244834 A1* | 8/2014 | Guedalia | H04L 67/16 709/224 |
| 2015/0134604 A1 | 5/2015 | Efrati et al. | |
| 2015/0227611 A1* | 8/2015 | Bao | G06F 17/11 707/737 |
| 2017/0187880 A1* | 6/2017 | Raanani | H04M 3/5232 |

* cited by examiner

IDENTIFYING AND PURGING UNWANTED CONTACTS FROM A CONTACT LIST BASED ON THE CONSTRUCTION OF A PERSONA PROFILE

BACKGROUND

The present invention generally relates to contact list management, and more specifically, to identifying and purging unwanted contacts from a contact list based on the construction of a persona profile.

In the environment of mobile device communications, users of mobile devices often change SIM cards and/or phone numbers that are associated with the user. For example, if a person relocates, the person may change their phone number or change the network operators of their mobile device. Sometimes the earlier number that was associated with the person continues to linger in a contact list of a group communication as members of the group communication may be unaware that the person now associated with the phone number is not the person that was originally associated with the phone number.

SUMMARY

Embodiments of the present invention provide a computer-implemented method for identifying and purging unwanted contacts. A non-limiting example of the computer-implemented method includes monitoring, by a system having one or more processors, electronic group communication that is conducted between two or more people, in which each person of the electronic group communication is associated with a contact number that is stored in a contact list. The method includes building, by the system, a persona profile for a person of the electronic group communication during a first period of time, the person being associated with a first contact number. The persona profile is built based at least in part on extracting, by the system, during the first period of time, from a plurality of interactions in the monitored electronic group communication, behavior data that is associated with the first contact number. The method includes detecting, by the system, during a second period of time, whether the person associated with the first contact number has changed by at least detecting, by the system, during the second period of time, whether the persona profile for the first person has changed. The method includes after detecting, by the system, during the second period of time that the persona profile for the person has changed, transmitting, by the system, an alert to at least one of the two or more people of the monitored electronic group communication indicating that the person associated with the first contact number has changed. In some embodiments of the present invention, the first contact number is then automatically removed from the contact list.

Embodiments of the present invention provide a system for identifying and purging unwanted contacts, the system having one or more processors configured to perform a method. A non-limiting example of the method includes monitoring, by the system, electronic group communication that is conducted between two or more people, in which each person of the electronic group communication is associated with a contact number that is stored in a contact list. The method includes building, by the system, a persona profile for a person of the electronic group communication during a first period of time, the person being associated with a first contact number. The persona profile is built based at least in part on extracting, by the system, during the first period of time, from a plurality of interactions in the monitored electronic group communication, behavior data that is associated with the first contact number. The method includes detecting, by the system, during a second period of time, whether the person associated with the first contact number has changed by at least detecting, by the system, during the second period of time, whether the persona profile for the first person has changed. The method includes after detecting, by the system, during the second period of time, that the persona profile for the person has changed, transmitting, by the system, an alert to at least one of the two or more people of the monitored electronic group communication indicating that the person associated with the first contact number has changed. In some embodiments of the present invention, the first contact number is then automatically removed from the contact list. Embodiments of the invention provide a computer program product for identifying and purging unwanted contacts, the computer program product comprising a computer readable storage medium having program instructions embodied therewith. The program instructions are executable by a system having one or more processor to cause the system to perform a method. A non-limiting example of the method includes monitoring, by the system, electronic group communication that is conducted between two or more people, in which each person of the electronic group communication is associated with a contact number that is stored in a contact list. The method includes building, by the system, a persona profile for a person of the electronic group communication during a first period of time, the person being associated with a first contact number. The persona profile is built based at least in part on extracting, by the system, during the first period of time, from a plurality of interactions in the monitored electronic group communication, behavior data that is associated with the first contact number. The method includes detecting, by the system, during a second period of time, whether the person associated with the first contact number has changed by at least detecting, by the system, during the second period of time, whether the persona profile for the first person has changed. The method includes after detecting, by the system, during the second period of time, that the persona profile for the person has changed, transmitting, by the system, an alert to at least one of the two or more people of the monitored electronic group communication indicating that the person associated with the first contact number has changed, and removing the first contact number from the contact list.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
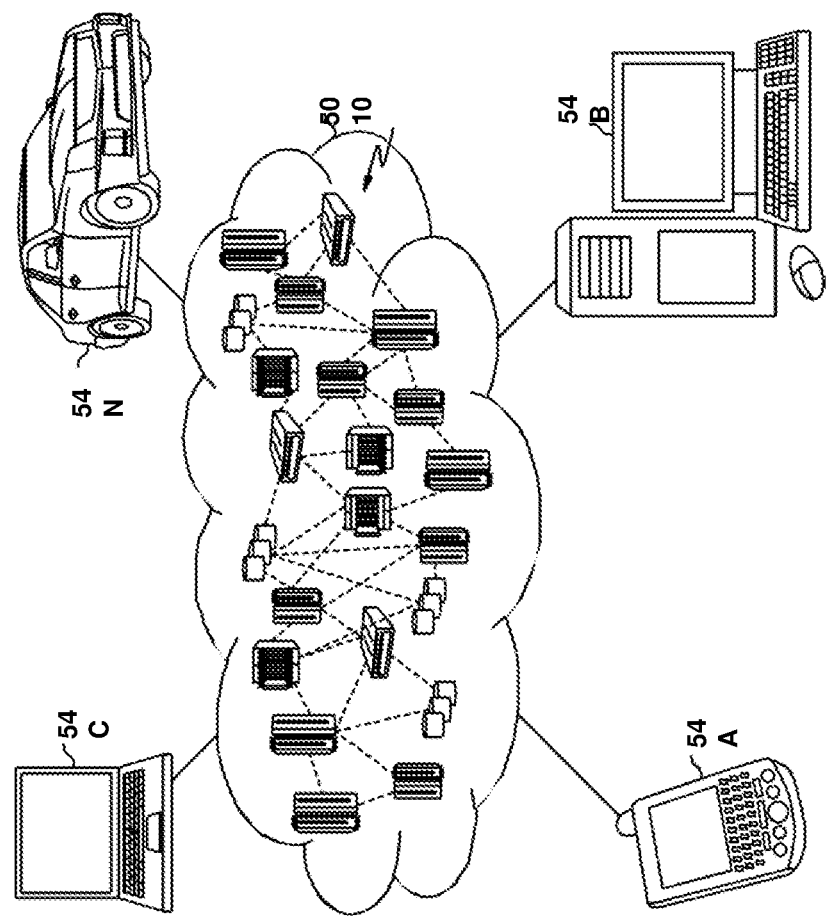
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
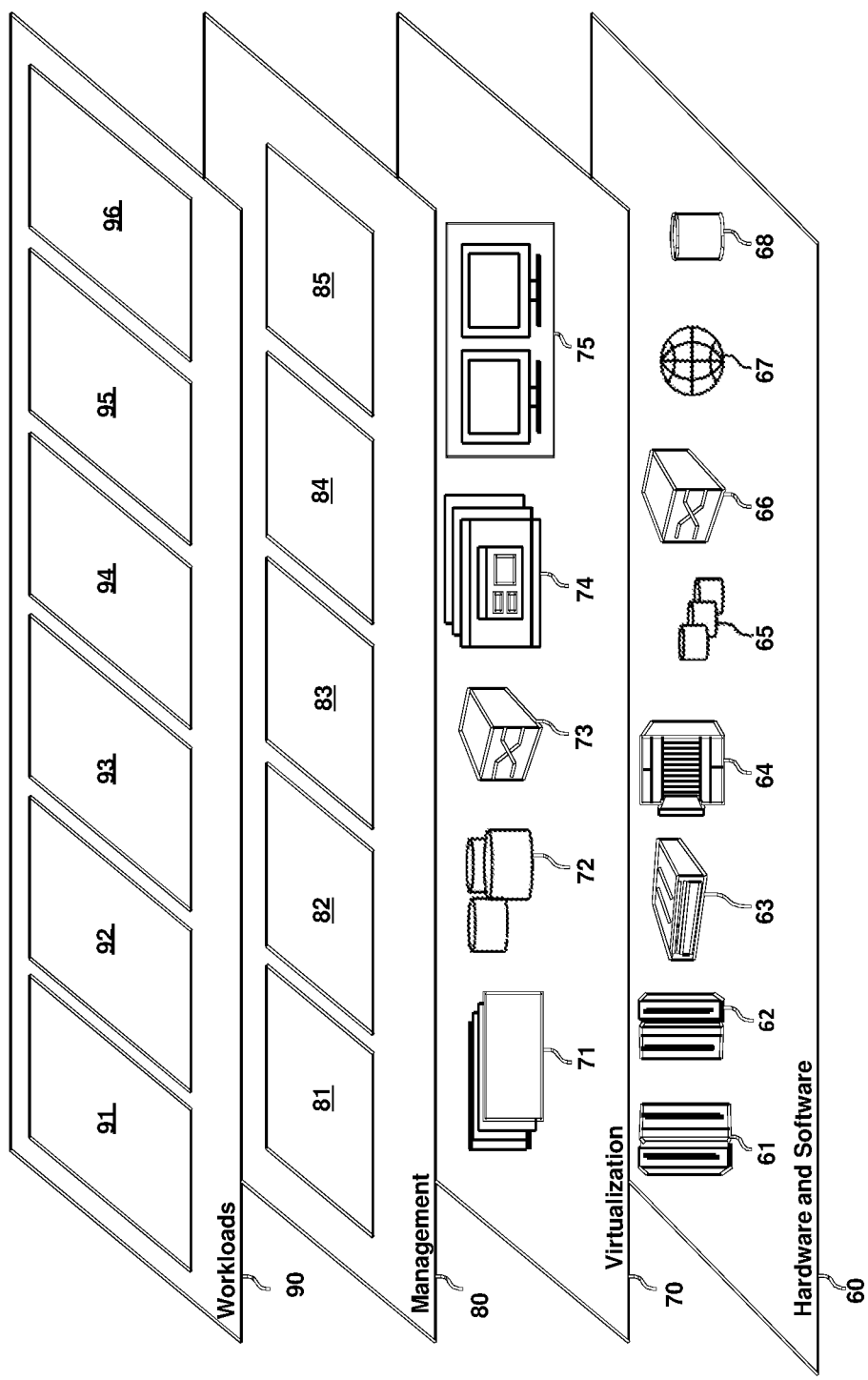
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contact management processing 96.

Turning now to an overview of technologies that are more specifically relevant to aspects of the invention, in the environment of mobile device communication, users of mobile devices often change SIM cards and/or phone numbers. For example, if a person relocates, the person may change their phone number or change the network operators of their mobile device. Sometimes the earlier number that was associated with the person continues to linger in a contact list of a group chat that is being conducted via a social communication application. Over time the network that issued the earlier phone number may issue that number to another person. Members of the group communication may be left unaware that the person, now associated with the phone number, is not the person that was originally associated with the phone number. Thus members of the chat group may run the risk of accidentally sharing personal or confidential information to the new person.

Turning now to an overview of the aspects of the invention, one or more embodiments of the invention addresses the above-described shortcomings of the prior art by providing a system that is able to identify and purge unwanted contacts from a contact list by building and comparing a persona profile, for a contact number associated with a user, from behavior information that is extracted from a monitored electronic group communication that is conducted between two or more users at various points in time. In some embodiments of the present invention, the first contact number is then automatically removed from the contact list. In some embodiments of the present invention, the system provides further security by detecting whether a change has occurred between the Internet of Things (IoT) devices that were previously associated with the user and the IoT devices that are presently associated with the user and then removing the contact number.

Consider an example where a first person is part of a group chat and the user uses his phone number to communicate via a mobile phone. A persona profile may be built based on the first person's interaction with the group chat and the user's usage of their mobile phone. A persona profile unique to the first person is built over a period of time. If the first person changes his phone number and if a second person is later assigned the first person's now previous number, others of the group may not be left aware of this change. To assist in making the user aware of the change, a second persona profile is built at a second period of time by capturing messages that are shared by the second person. The two persona profiles are then compared, and if it is detected that the profiles are substantially different, the system may notify the members of the group of the change. In some embodiments of the present invention, the first contact number is then automatically removed from the contact list. An additional check may be performed by detecting a change in the IoT devices that are associated with the persona profile of the first user.

Thus one or more aspects of the invention provide increased security in group communication environments by assisting in the removal of unknown and/or outdated contacts without the need of manual intervention by users of the group communication.

Figure 3:
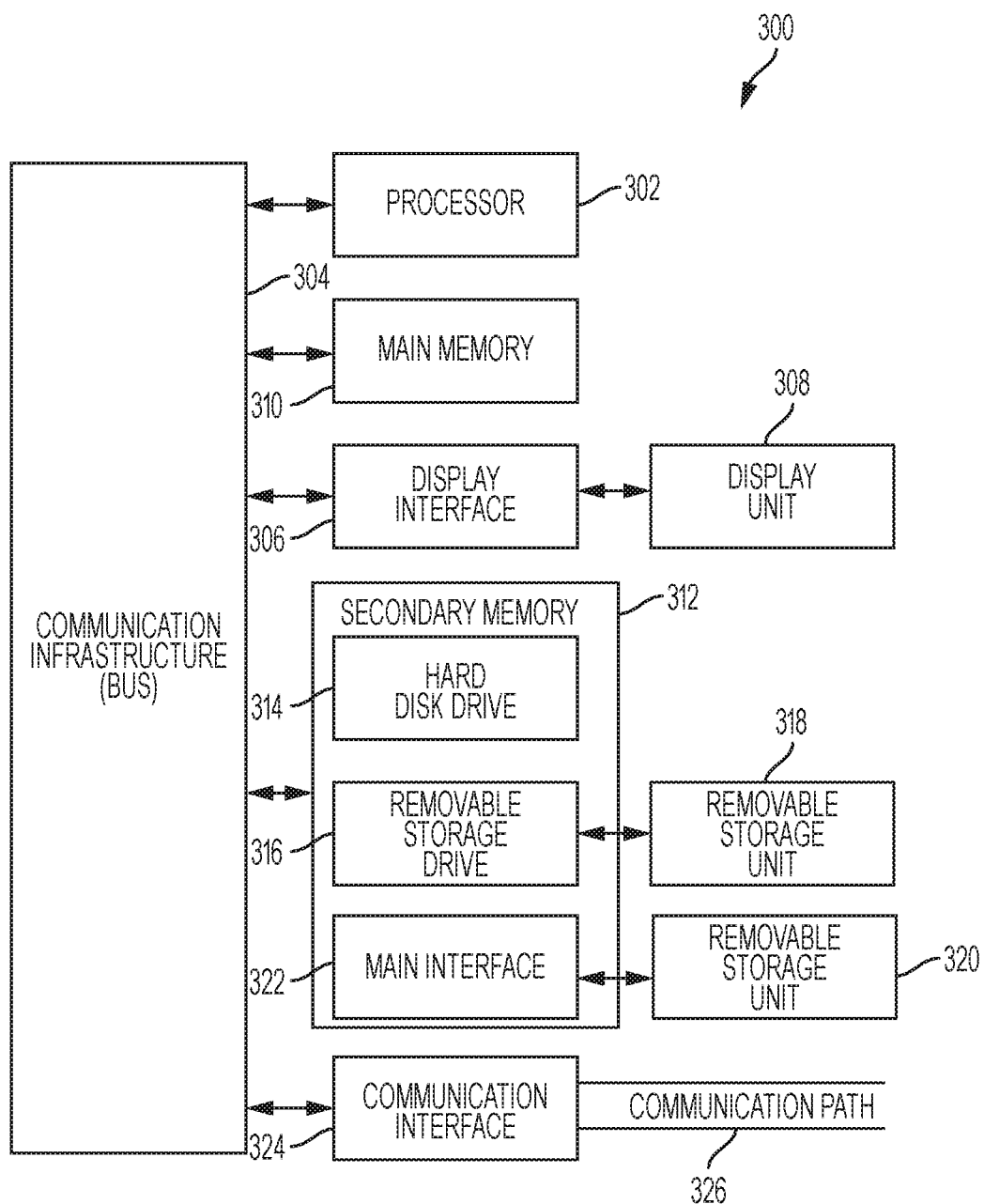
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
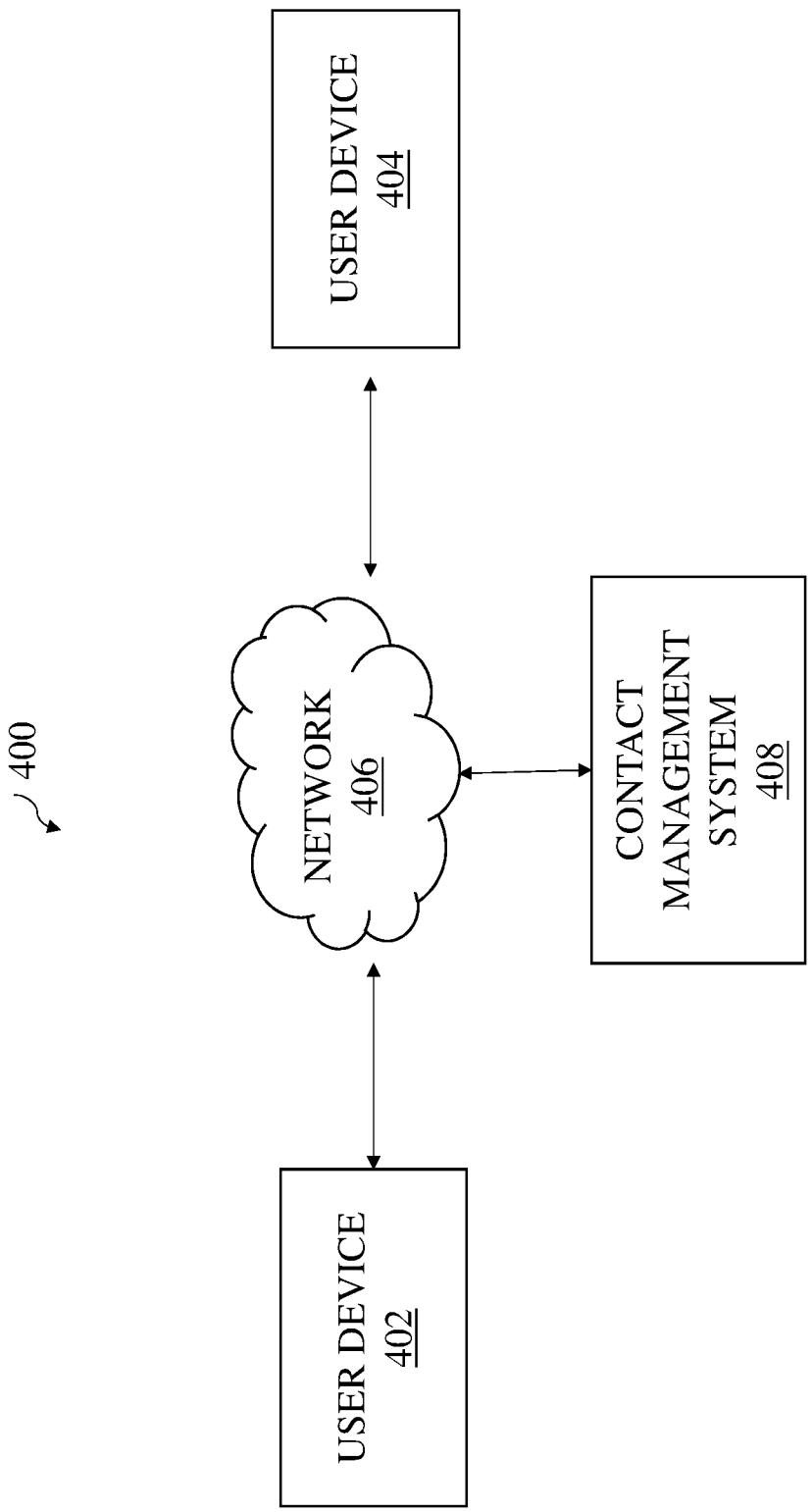
FIG. 4 depicts an exemplary computing environment for identifying and purging unwanted contacts in accordance with one or more embodiments of the present invention.

FIG. 4 illustrates a block diagram of an example, non-limiting computing environment 400 in accordance with one or more embodiments of the present invention. Environment 400 includes one or more user devices 402, 404, a network 406, and a contact management system 408 for identifying and purging unwanted contacts. Each user device 402, 404 includes one or more communication applications that allow for a user of a user device 402, 404 to participate in a group communication by transmission of data from the user device 402, 404 to another user device 402, 404 via the network 406. The communication can include, for example, the transmission of text, video, and/or audio communications between user devices 402, 404 via a wired or wireless communication network. In some embodiments of the present invention, the group communication is conducted via a chat application that is running on each respective user device 402, 404. As will be discussed in further detail below, the contact management system 408 is configured to identify and purge unwanted contacts by receiving and/or monitoring electronic group communication that is conducted between at least two or more people (e.g., between user device 402 and user device 404), building a persona profile for at least one person of the electronic group communication based on behavior data that is extracted from the electronic group communication, and upon detecting a change in the built persona, transmitting an alert to one or more users of the group communication or a group administrator. In some embodiments of the present invention, the persona profile is further built based on data streams that are received from the IoTs that are linked to the at least one person.

Figure 5:
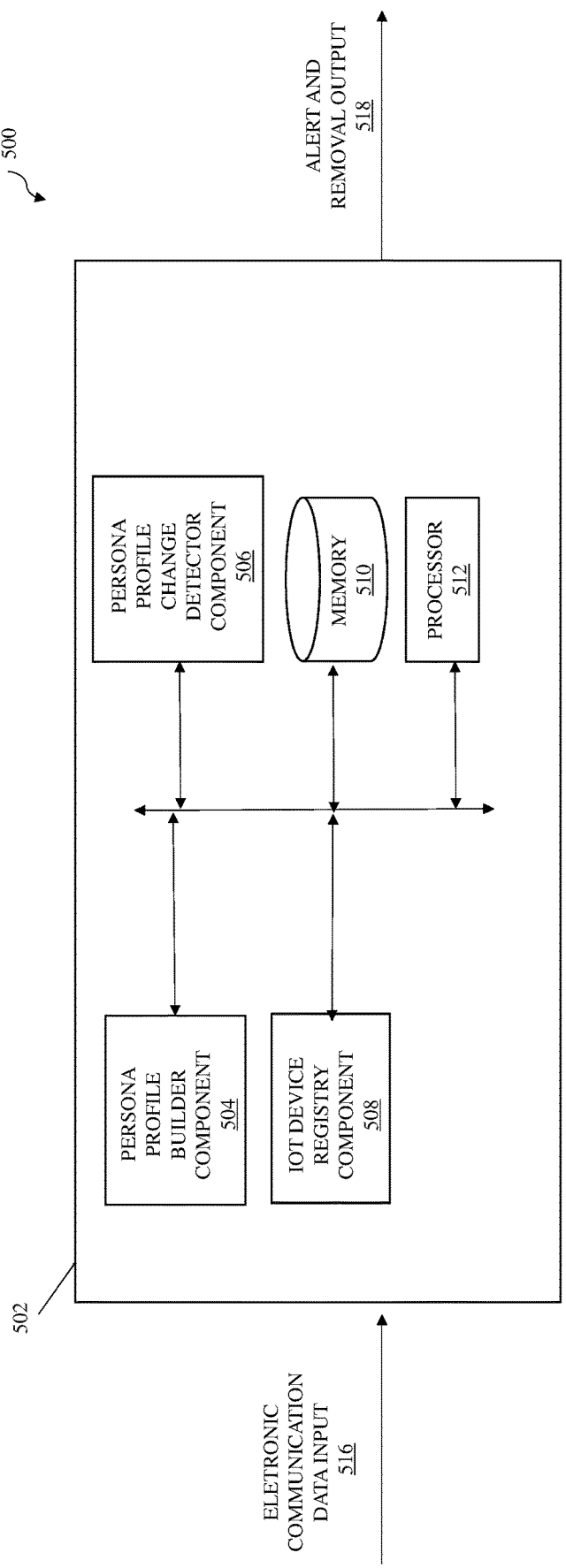
FIG. 5 depicts an exemplary system that identifies and purges unwanted contacts in accordance with one or more embodiments of the present invention.

FIG. 5 depicts an exemplary system 500 that includes a contact manager component 502 for identifying and purging unwanted contacts, in accordance with one or more embodiments of the present invention. The contact manager component 502 includes a persona profile builder component 504, a persona profile change detector component 506, and an IoT device registry component 508. In some embodiments of the present invention, the contact manager component 502 constitutes machine-executable component(s) embodied within machine(s), (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the invention, the contact manager component 502 includes a memory 510 that stores computer executable components and instructions. Furthermore, the contact manager component 502, in some embodiments of the invention, includes a processor 512 to facilitate execution of the instructions (e.g., computer executable components and corresponding instructions) by the contact manager component 502. As shown, the persona profile builder component 504, the persona profile change detector component 506, the IoT device registry component 508, the memory 510, and/or the processor 512 are electrically and/or communicatively coupled to one another in one or more embodiments of the invention.

The contact manager component 502 is configured to monitor electronic group communication that is conducted between two or more people in which each person of the electronic group communication is associated with a respective contact number that is stored in a contact list. This may be achieved by receiving and/or intercepting electronic communication data input 516 that is transmitted from one or more user devices of the two or more people. As noted above, each person may have one or more user devices that are configured to participate in a group communication with one or more user devices of another person. The group communication may include, for example, group chat and/or text communication that is facilitated via the web or via an application running on each respective user device. For example, a first user may have a mobile phone that includes a group chat application that is executing therein. The first user may communicate with a second user having a mobile phone via a phone number that is associated with the second user. Similarly, the mobile device of the second user may include a group chat application that can be executed therein. In some embodiments of the present invention, the contact manager component 502 is configured to monitor the electronic group communication by passively or actively intercepting or receiving a copy of each user's communication that is transmitted in the group communication (e.g., electronic communication data input 516).

The persona profile builder component 504 of the contact manager component 502 is configured to build a persona profile during a first period of time for at least one person of the electronic group communication from a plurality of interactions that are extracted from the monitored electronic group communication during the first period of time. In some embodiments of the present invention, the plurality of interactions include a plurality of audio, video, and/or text communications that are transmitted and/or received by the person via their respective user device during the first period of time. For example, if the contact number is a phone number of a mobile device, the person may be sending and/or receiving text messages, chat messages, video message, and/or audio messages to a phone number associated with a different person of the electronic group communication. During this first period of time, the persona profile is built by at least extracting from the electronic group communication (e.g., electronic communication data input 516), behavior data that is associated with the first contact number, and then building a persona profile that uniquely identifies the person based on the extracted behavior data. In some embodiments of the present invention, the behavior data extracted from the monitored electronic group communication includes at least one of a tonal quality of the person, language spoken by the person, language typed by the person, average time taken by the person to respond to a message, style of conversation by the person, or types of content communicated by the person. In some embodiments of the present invention, electronic group communication comprises transmission of audio data in which, in some embodiments, the extracting of the behavior data during the first period of time includes at least one of a tonal quality of the person, language spoken by the person, language typed by the person, time taken by the person to respond to a message, or style of conversation by the person. In some embodiments of the present invention, electronic group communication comprises the transmission of text data in which, in some embodiments, the extracting of the behavior data during the first period of time includes at least one of a language typed by the person or an average time taken by the person to respond to a message.

The persona profile change detector component 506 of the contact manager component 502 is configured to detect during a second period of time whether the person associated with the first contact number has changed. The change may be detected by a variety of suitable ways one of which may include comparing attributes of each profile to determine whether the attributes corresponding to both personal profiles match. In some embodiments of the present invention, if there is a significant change between the first and second profiles, an alert is transmitted to an administrator of the group communication or to one or more members of the group communication (e.g., alert and removal output 518). In the event that the two profiles are substantially similar, in some embodiments of the present invention the persona profile change detector component 506 is configured to discard the first persona profile and only keep the second persona profile as the second is the latest profile. In some embodiments, the first and second period comprises a predetermined number of days, such as seven days for example.

In some embodiments of the present invention, the building of the persona profile and the detecting of the change in the persona profile includes, building by the persona profile builder component 504 a first persona profile from behavior data associated with the first contact number of the person that is extracted during the first period of time from a first plurality of interactions in the monitored electronic group communication, building by the persona profile builder component 504 a second persona profile from behavior data associated with the first contact number of the person that is extracted during the second period of time from a second plurality of interactions in the monitored electronic group communication, generating a score by the persona profile change detector component 506 that measures the similarity or dissimilarity between the first and second persona profile, and upon determining that the score meets a threshold, storing an indication in memory, by the system, that the person associated with the first contact number has changed.

In some embodiments of the present invention, the score utilized in the detection of a change in the persona profiles is a dissimilarity score that measures the dissimilarity between the first and second profiles, in which the indication is stored upon determining that the dissimilarity score is greater than or equal to a maximum dissimilarity threshold. In some embodiments of the present invention, the score is a similarity score that measures the similarity between the first and second profiles, in which the indication is stored upon determining that the similarity score is less than or equal to a minimum similarity threshold.

The contact manager component 502 is configured to transmit an alert to at least one person, of the two or more people of the monitored electronic group communication, or a group administrator in response to detecting during the second period of time that the persona profile for the person that was originally associated with the first contact number has changed. In some embodiments of the present invention, the contact manager component 502 is further configured to remove the first contact number from the contact list after detecting during the second period of time that the persona profile for the person has changed.

In some embodiments of the present invention, the contact manager component 502 is configured to generate an IoT registry via the IoT registry component 508. In some embodiments of the present invention, the IoT device registry includes a listing of IoT devices that are associated with the person. In some embodiments of the present invention, the contact manager component 502 is configured to detect whether the listing of IoT devices associated with the person in the generated IoT device register has changed. In some embodiments of the present invention, the detection of the change in the listing of IoT devices is performed only after it is detected during the second period of time that the persona profile for the person has changed. In some embodiments of the present invention, the contact manager component 502 is configured to transmit the alert and remove the first contact only after it is detected that the listing of IoT devices associated with the person has changed.

In some embodiments of the present invention, the contact manager component 502 is configured to obtain data streams from the person's contextual IoT devices and then cognitively analyze the received streams of data via one or more machine learning algorithms. Various suitable machine learning algorithms may be used. In one example, a Watson API service may be used to implement and/or call a machine learning algorithm that analyzes the data streams obtained from the person's contextual IoT devices. The following are non-limiting examples of cognitive APIs that may be used: Alchemy Language Icon Alchemy Language, Conversation Service Icon Conversation, Dialog Icon Dialog (Deprecated), Document Conversion Icon Document Conversion, Language Translator Icon Language Translator, Natural Language Classifier Icon Natural Language Classifier, Natural Language Understanding Icon Natural Language Understanding, Personality Insights Icon Personality Insights, Retrieve and Rank Icon Retrieve and Rank, Tone Analyzer Icon Tone Analyzer, Visual Recognition Icon Visual Recognition, Discovery Icon Discovery, and Tradeoff Analytics Icon Tradeoff Analytics.

In building persona profiles, different attributes from the data streams may be tracked by the contact manager component 502. For example, activities participated by the person may be tracked, as well as tone, messaging style, and the language that the person speaks in. The result of this analysis may be used in building the persona profiled that is to be associated with the person. The profile may be refined over time to update the analysis with new data. In some embodiments of the present invention, the contact manager component 502 is configured to check whether the persona profile that was created during the first period of time matches the persona profile being emitted by a current set of IoT devices. In some embodiments of the present invention, if there is a mismatch of identity, an alert may be sent to one or more members of the group communication or a group administrator.

Figure 6:
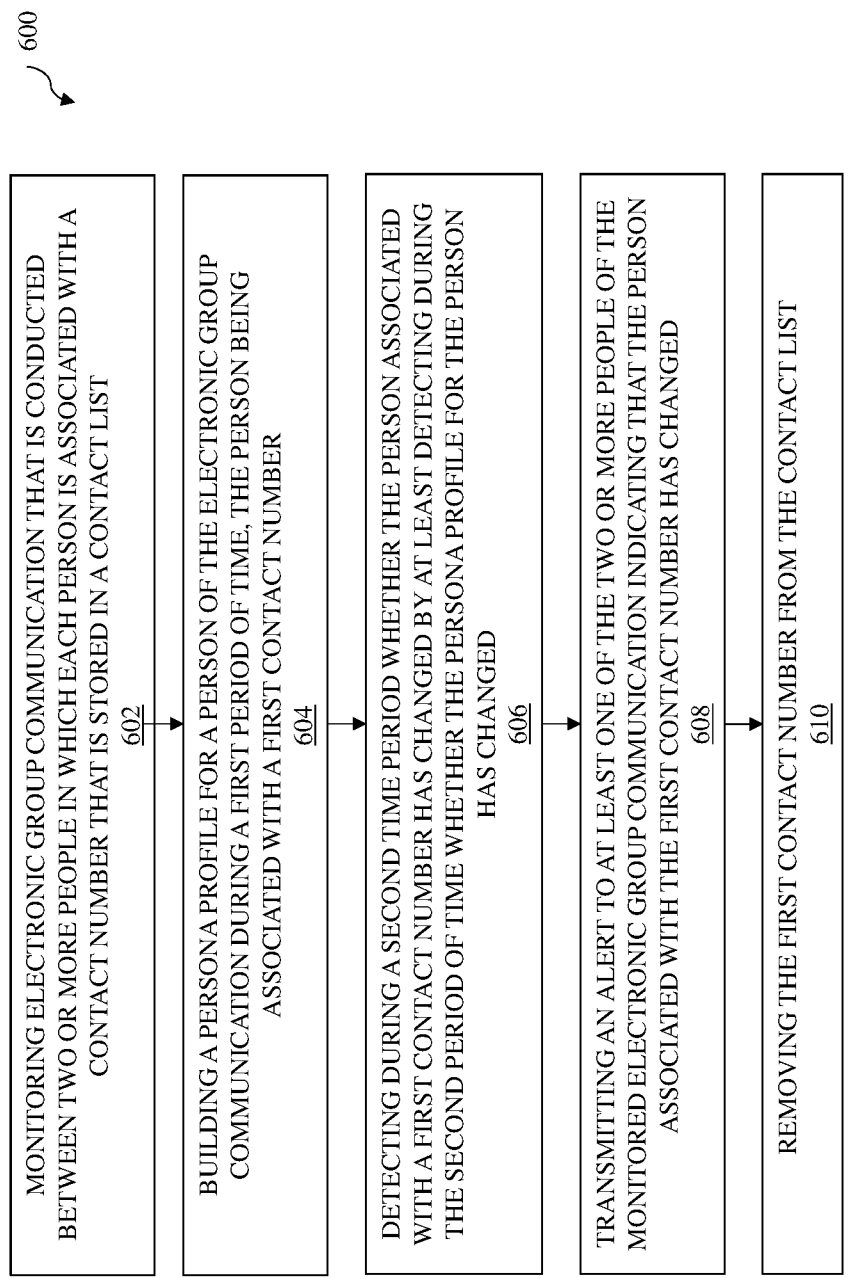
FIG. 6 depicts a flow diagram illustrating a methodology in accordance with one or more embodiments of the present invention.

Additional details of the operation of system 500 will now be described with reference to FIG. 6, wherein FIG. 6 depicts a flow diagram illustrating a methodology 600 according to one or more embodiments of the present invention. At 602, communication that is conducted between two or more people is monitored in which each person is associated with a contact number that is stored in a contact list. At 604, a persona profile is built for a person of the electronic group during a first period time, in which the person is associated with a first contact number. At 604, a determination is made during a second period of time as to whether the person associated with a first contact number has changed At 606, a determination is made during a second period of time as to whether the person associated with a first contact number has changed. This determination is made by at least detecting, during the second period of time, whether the persona profile for the person has changed. At 608, in response to detecting that the persona profile for the person has changed, an alert is transmitted to at least one person, of the two or more people of the monitored electronic group communication, in which the alert provides an indication that the person associated with the first contact number has changed. At 610, the first contact number is removed from the contact list.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying and purging unwanted contacts comprising:
 monitoring, by a system comprising one or more processors, electronic group communication that is conducted between two or more people, wherein each person of the electronic group communication is associated with a contact number that is stored in a contact list;

building, by the system, a persona profile for a person of the electronic group communication during a first period of time, wherein the person is associated with a first contact number, wherein the persona profile is built based at least in part on extracting, during the first period of time, from a plurality of interactions in the monitored electronic group communication, behavior data that is associated with the first contact number, wherein the extracted behavior data of the personal profile for the person includes a tonal quality of the person;

detecting, by the system, during a second period of time, whether the person associated with the first contact number has changed by at least detecting, during the second period of time, whether the persona profile for the person has changed, wherein the detecting the change in the persona profile includes detecting a change in the tonal quality of the person;

generating, by the system, an internet of things (IoT) device registry that includes a listing of IoT devices that are associated with the person;

detecting, by the system, during the second period of time, whether the listing of IoT devices associated with the person in the generated IoT device registry has changed, wherein the detection of the change in the listing of IoT devices is performed only after if it detected, during the second period of time, that the persona profile has changed; and after detecting, during the second period of time, that the persona profile for the person has changed, transmitting, by the system, an alert to at least one of the two or more people of the monitored electronic group communication indicating that the person associated with the first contact number has changed, wherein the alert, indicating that the person associated with the first contact number has changed, is transmitted only after it is detected, during the second period of time, that the listing of IoT devices associated with the person has changed.

2. The computer-implemented method of claim 1, wherein the extracting of behavior data by the system during the first period of time includes extracting from the monitored electronic group communication language spoken by the person, language typed by the person, average time taken by the person to respond to message, style of conversation by the person, and types of content communicated by the person.

3. The computer-implemented method of claim 1, wherein building a persona profile and detecting a change in the persona profile comprises:

building, by the system, a first persona profile from behavior data associated with the first contact number of the person that is extracted, by the system, during the first period of time from a first plurality of interactions in the monitored electronic group communication, wherein the extracted behavior data further includes at least one of language spoken by the person, language typed by the person, time taken by the person to respond to a message, or style of conversation by the person;

building, by the system, a second persona profile from behavior data associated with the first contact number of the person that is extracted, by the system, during the second period of time from a second plurality of interactions in the monitored electronic group communication;

generating, by the system, a dissimilarity score between the first and second persona profiles; and upon determining that the dissimilarity score is greater than or equal to a maximum dissimilarity threshold, storing an indication in memory, by the system, that the person associated with the first contact number has changed.

4. The computer-implemented method of claim 1, wherein the electronic group communication comprises transmission of audio data, and wherein the extracting of behavior data, by the system, during the first period of time, includes extracting from the audio data a language spoken by the person and an average time taken by the person to respond to a message.

5. The computer-implemented method of claim 1, wherein the electronic group communication comprises transmission of text data, and wherein the extracting of behavior data, by the system, during the first period of time, includes extracting from the text data a language typed by the person and an average time taken by the person to respond to a message.

6. The computer-implemented method of claim 1, wherein the electronic group communication comprises transmission of messages via a chat messaging application executing on a mobile device of each of the two or more people.

7. A computer program product for identifying and purging unwanted contacts, the computer program product comprising a computer readable storage medium having program instructions embodied therewith, wherein the computer readable storage medium is not a transitory signal per se, the program instructions executable by a system comprising one or more processors to cause the system to perform a method comprising:

building, by the system, a persona profile for a person of the electronic group communication during a first period of time, wherein the person is associated with a first contact number, wherein the persona profile is built based at least in part on extracting, during the first period of time, from a plurality of interactions in the monitored electronic group communication, behavior data that is associated with the first contact number, wherein the extracted behavior data of the personal profile for the person includes a tonal quality of the person;

detecting, by the system, during a second period of time, whether the person associated with the first contact number has changed by at least detecting, during the second period of time, whether the persona profile for the person has changed, wherein the detecting the change in the persona profile includes detecting a change in the tonal quality of the person;

generating, by the system, an internet of things (IoT) device registry that includes a listing of IoT devices that are associated with the person;

detecting, by the system, during the second period of time, whether the listing of IoT devices associated with the person in the generated IoT device registry has changed, wherein the detection of the change in the listing of IoT devices is performed only after if it detected, during the second period of time, that the persona profile has changed; and after detecting, during the second period of time, that the persona profile for the person has changed, transmitting, by the system, an alert to at least one of the two or more people of the monitored electronic group communication indicating that the person associated with the first contact number has changed, wherein the alert, indicating that the person associated with the first contact number has changed, is transmitted only after it is detected, during the second period of time, that the listing of IoT devices associated with the person has changed.

8. The computer program product of claim 7, wherein the extracting of behavior data by the system during the first period of time includes extracting from the monitored electronic group communication language spoken by the person, language typed by the person, average time taken by the person to respond to a message, style of conversation by the person, and types of content communicated by the person.

9. The computer program product of claim 7, wherein building a persona profile and detecting a change in the persona profile comprises:
   building, by the system, a first persona profile from behavior data associated with the first contact number of the person that is extracted, by the system, during the first period of time from a first plurality of interactions in the monitored electronic group communication, wherein the extracted behavior data further includes at least one of a language spoken by the person, language typed by the person, time taken by the person to respond to a message, or style of conversation by the person;
   building, by the system, a second persona profile from behavior data associated with the first contact number of the person that is extracted, by the system, during the second period of time from a second plurality of interactions in the monitored electronic group communication;
   generating, by the system, a dissimilarity score between the first and second persona profiles; and
   upon determining that the dissimilarity score is greater than or equal to a maximum dissimilarity threshold, storing an indication in memory, by the system, that the person associated with the first contact number has changed.

10. The computer program product of claim 7, wherein the electronic group communication comprises transmission of audio data, and wherein the extracting of behavior data, by the system, during the first period of time includes extracting from the audio data a language spoken by the person and an average time taken by the person to respond to a message.

11. The computer program product of claim 7, wherein the electronic group communication comprises transmission of text data, and wherein the extracting of behavior data, by the system, during the first period of time includes extracting from the text data a language typed by the person and an average time taken by the person to respond to a message.

12. The computer program product of claim 7, wherein the electronic group communication comprises transmission of messages via a chat messaging application executing on a mobile device of each of the two or more people.

13. A system for identifying and purging unwanted contacts, the system comprising one or more processors configured to perform a method comprising:
   monitoring, by the system, electronic group communication that is conducted between two or more people, wherein each person of the electronic group communication is associated with a contact number that is stored in a contact list;
   building, by the system, a persona profile for a person of the electronic group communication during a first period of time, wherein the person is associated with a first contact number, wherein the persona profile is built based at least in part on extracting, during the first period of time, from a plurality of interactions in the monitored electronic group communication, behavior data that is associated with the first contact number, wherein the extracted behavior data of the personal profile for the person includes a tonal quality of the person;
   detecting, by the system, during a second period of time, whether the person associated with the first contact number has changed by at least detecting, during the second period of time, whether the persona profile for the person has changed, wherein the detecting the change in the persona profile includes detecting a change in the tonal quality of the person;
   generating, by the system, an internet of things (IoT) device registry that includes a listing of IoT devices that are associated with the person;
   detecting, by the system, during the second period of time, whether the listing of IoT devices associated with the person in the generated IoT device registry has changed, wherein the detection of the change in the listing of IoT devices is performed only after if it detected, during the second period of time, that the persona profile has changed; and
   after detecting, during the second period of time, that the persona profile for the person has changed, transmitting, by the system, an alert to at least one of the two or more people of the monitored electronic group communication indicating that the person associated with the first contact number has changed, wherein the alert, indicating that the person associated with the first contact number has changed, is transmitted only after it is detected, during the second period of time, that the listing of IoT devices associated with the person has changed.

14. The system of claim 13, wherein the extracting of behavior data by the system during the first period of time includes extracting from the monitored electronic group communication language spoken by the person, language typed by the person, average time taken by the person to respond to a message, style of conversation by the person, and types of content communicated by the person.

15. The system of claim 13, wherein building a persona profile and detecting a change in the persona profile comprises:
   building, by the system, a first persona profile from behavior data associated with the first contact number of the person that is extracted, by the system, during the first period of time from a first plurality of interactions in the monitored electronic group communication, wherein the extracted behavior data further includes at least one of a language spoken by the person, language typed by the person, time taken by the person to respond to a message, or style of conversation by the person;
   building, by the system, a second persona profile from behavior data associated with the first contact number of the person that is extracted, by the system, during the second period of time from a second plurality of interactions in the monitored electronic group communication;
   generating, by the system, a dissimilarity score between the first and second persona profiles; and upon determining that the dissimilarity score is greater than or equal to a maximum dissimilarity threshold, storing an indication in memory, by the system, that the person associated with the first contact number has changed.

16. The system of claim 13, wherein the electronic group communication comprises transmission of text data, and wherein the extracting of behavior data during the first period of time includes extracting from the text data a language typed by the person and an average time taken by the person to respond to a message.

17. The system of claim 13, wherein the electronic group communication comprises transmission of messages via a chat messaging application executing on a mobile device of each of the two or more people.

\* \* \* \* \*